Patented June 17, 1930

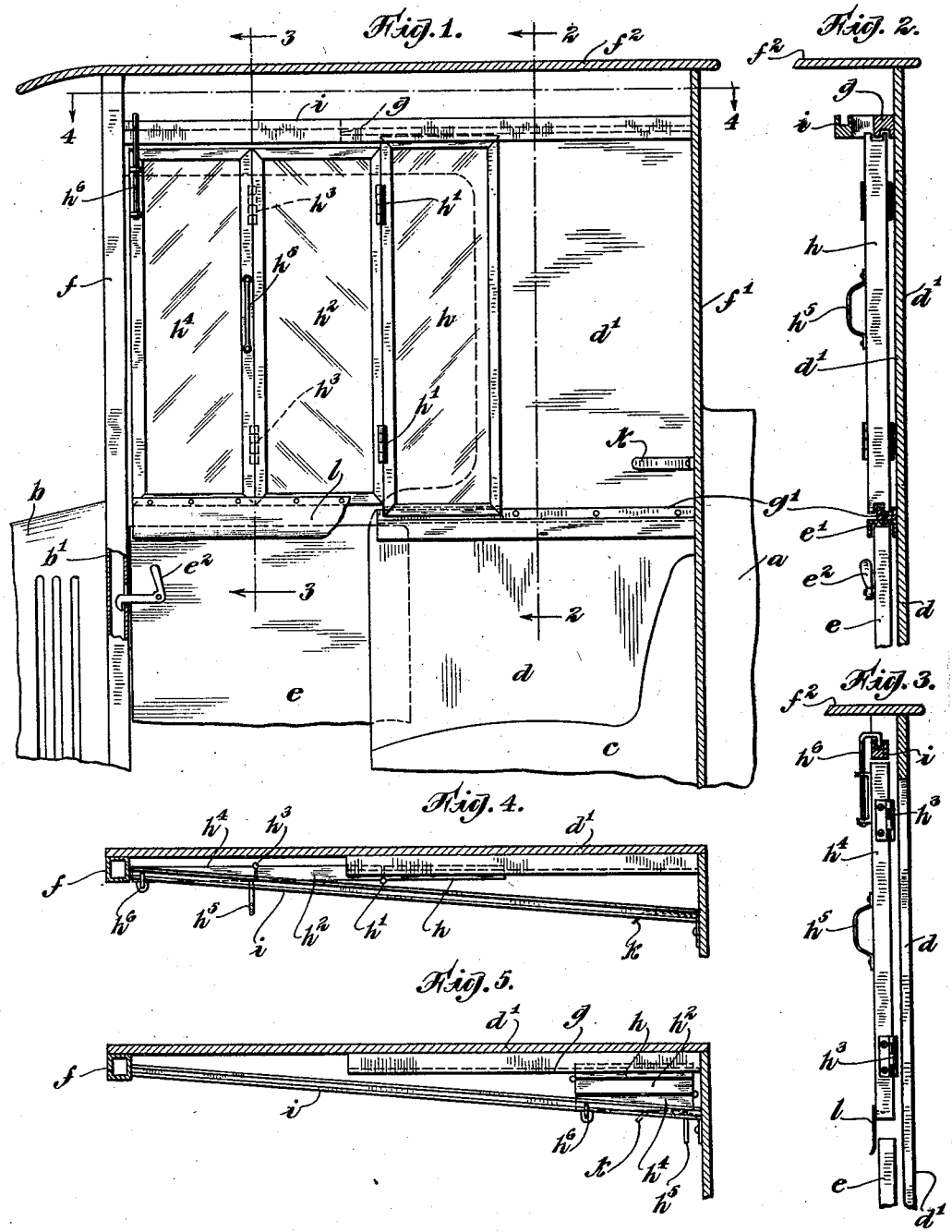

1,763,715

UNITED STATES PATENT OFFICE

ROBERT D. MARX, OF BROOKLYN, NEW YORK

VEHICLE BODY CONSTRUCTION

Application filed May 22, 1929. Serial No. 365,119.

This invention consists in an improved closure for vehicle bodies and has been designed with special reference to the closure of the cabs of motor vehicles, although as will be understood the invention is not necessarily limited to that particular use. When weather conditions permit the cabs of motor trucks are usually open at each side as much as structural features permit, but in bad weather they are closed in for the protection and comfort of the driver. In practice such closing in of the cab is usually effected by curtains which are secured at their edges to the frame of the truck, but many disadvantages are incident to the use of such curtains. Other closures have been devised or proposed, but for some reason, probably awkwardness in manipulation, they have not come into general use. It is the object of this invention to provide a closure which can be manipulated readily either to close the cab or moved to open the cab, when desired, can be moved back and folded in the rear of the cab so that it shall occupy but little space and can there be retained against accidental dislodgement. The invention will be more fully explained hereinafter with reference to the accompanying drawing in which it is illustrated, and in which:

Figure 1 is a view in longitudinal, sectional elevation of a cab, as seen from the inside, a portion of the body and a portion of the hood being also shown, while the lower portion of the side closure is broken away.

Figures 2 and 3 are views in vertical section on the planes indicated by the broken lines 2—2 and 3—3 respectively of Figure 1.

Figure 4 is a view in horizontal section on the plane indicated by the broken line 4—4 of Figure 1, with the closure in closed position, and Figure 5 is a view in horizontal section also on the plane indicated by the broken line 4—4 of Figure 1, but with the closure in retired position.

In the embodiment of the invention illustrated there is shown so much of an ordinary motor truck cab as is necessary to enable the application of the invention to be understood, a portion of the truck body being indicated at $a$, a portion of the hood at $b$, and the usual driver's seat at $c$. The side of the cab is shown as closed by a fixed wall or panel $d$ from the bottom to a line somewhat above the back of the seat $c$, and the lower portion of the opening between such fixed portion $d$ and the front $b^1$ of the compartment is represented as adapted to be closed by a sliding door or panel $e$ which is guided in suitable ways, one of which is indicated at $e^1$, and is provided with a latch, as at $e^2$, by which it may be retained in closed position. The cab is shown as having the usual windshielded front $f$, a rear wall, as at $f^1$, and a roof or top, as at $f^2$. It is shown also as having a fixed wall or panel, as at $d^1$, at each end of the seat which may be integral with the lower portion $d$, this portion $d^1$ being narrower than the portion $d$, so as to permit of wider opening between its forward edge and the front $f$.

Each side wall is provided near the top with a guideway $g$ and slightly above the back of the seat $c$ with a guide $g^1$ to receive and guide a rear sliding door member $h^1$. To the forward edge of the sliding door member $h$ is hinged, as at $h^1$, a forward leaf or door member $h^2$ and to the front of the leaf or member $h^2$ is hinged, as at $h^3$, a second forward leaf or member $h^4$. The latter is provided with a handle, as at $h^5$, and with a sliding bolt $h^6$ which is preferably hooked, as shown in Figure 3, to engage from above a guideway $i$ which is extended from the front of the cab to or toward the rear of the cab and is slanted inward from the side wall $d^1$, all as clearly shown in Figures 4 and 5, this guideway $i$ being independent of and additional to the guideways $g$, $g^1$. The rear of the cab is provided with a spring clip $k$ to retain the door in position when folded and drawn back, as shown in Figure 5, and the bottom edges of the leaves or door members $h^2$, $h^4$ may be provided with a flexible window flap, as at $l$, to close such space as is left between the bottom edges of these leaves and the top edge of the lower sliding section $e$.

When the closure is in fully extended position the handle $h^5$ is grasped and the three leaves or door members are made to slide back until the rear member $h$ reaches the limit of its motion at the back of the cab. During this motion of the leaf or member $h$ the two forward hinged leaves or members $h^2$, $h^4$, are supported by and carried with the sliding member $h$. During such movement the forward end of the closure is engaged, by the bolt $h^6$, with the guideway $i$ and is guided thereby, being moved in somewhat from the side wall of the cab by a slight inward pull on the handle $h^5$. The hinge line at $h^3$, between the members $h^2$ and $h^4$, is drawn inward and at the same time the member $h^2$ is swung on the hinge line $h^1$ and the two members $h^2$ and $h^4$ are folded together and against the sliding member $h$ so that as the sliding member approaches the rearward limit of its motion the two members $h^2$ and $h^4$ are folded closely against the sliding member $h$ and are received between the sliding member and the spring clip or detent $k$. The full space between the forward edge of the upper portion $d^1$ of the wall and the front of the cab is thus opened and the closure is laid back against the side wall of the cab near the rear quite out of the way. When the cab is to be closed at the side a forward pull and push upon the handle $h^5$ serves to move the sliding member $h$ forward into position and at the same time to move the hinged members into the completely closed position indicated at Figures 1 and 4. It will be observed that by reason of the hinging of the members $h^2$ and $h^4$ forward of the sliding member $h$ and the provision of the separate track or guideway $i$, the swinging movement of the members $h^2$ and $h^4$ takes place forward of the position of the operator's body and does not incommode the operator.

It will be understood that a single hinged member might suffice in some cases and that relative dimensions and arrangements of the parts might be varied to suit different conditions of use.

I claim as my invention:

1. In a closure for a vehicle cab, the combination of upper and lower guideways, a rear sliding door member supported and guided by said guideways, a hinged door member supported by the sliding door member forward of the same, and an upper guideway independent of the first named guideways and with which the hinged member is engaged at its forward edge.

2. In a closure for a vehicle cab, the combination of upper and lower guideways, a rear sliding door member supported and guided by said guideways, a hinged door member supported by the sliding door member forward of the same, a second hinged member hinged upon the first hinged member, and an upper guideway independent of the first named guideways and with which the second hinged member is engaged at its forward edge.

3. In a closure for a vehicle cab, the combination of upper and lower guideways, a rear sliding door member supported and guided by said guideways, a hinged door member supported by the sliding door member forward of the same, and an upper guideway independent of the first named guideways and with which the hinged member is engaged at its forward edge, said upper guideway being slanted inward from the side of the cab toward the rear.

4. In a closure for a vehicle cab, the combination of upper and lower guideways, a rear sliding door member supported and guided by said guideways, a hinged door member supported by the sliding door member forward of the same, an upper guideway independent of the first named guideways and a hooked bolt at the forward edge of the hinged member and arranged to engage the last named upper guideway from above.

5. In a closure for a vehicle cab, the combination of upper and lower guideways, a rear sliding door member supported and guided by said guideways, a hinged door member supported by the sliding door member forward of the same, an upper guideway independent of the first named guideways and with which the hinged member is engaged at its forward edge, and a clip secured at the rear of the cab to receive between itself and the side wall of the cab the sliding door member and the hinged member folded against the sliding member.

This specification signed this 21st day of May, A. D. 1929.

ROBERT D. MARX.